(12) United States Patent  
Horiuchi

(10) Patent No.: US 7,398,003 B2  
(45) Date of Patent: Jul. 8, 2008

(54) INDEX DATA GENERATION APPARATUS, INDEX DATA GENERATION METHOD, INDEX DATA GENERATION PROGRAM AND RECORDING MEDIUM ON WHICH THE PROGRAM IS RECORDED

(75) Inventor: Naoaki Horiuchi, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 643 days.

(21) Appl. No.: 10/957,979

(22) Filed: Oct. 5, 2004

(65) Prior Publication Data

US 2005/0074226 A1    Apr. 7, 2005

(30) Foreign Application Priority Data

Oct. 7, 2003    (JP)    ............................ P2003-348390

(51) Int. Cl.  
*H04N 5/93* (2006.01)

(52) U.S. Cl. .............................. 386/52; 386/46; 386/95

(58) Field of Classification Search .................. 386/46, 386/52, 83, 95, 125, 126; 348/14.12, 384.1, 348/723; 382/130, 173, 226, 286, 294  
See application file for complete search history.

(56) References Cited

U.S. PATENT DOCUMENTS

| | | | | |
|---|---|---|---|---|
| 4,635,293 | A | * | 1/1987 | Watanabe .................... 382/130 |
| 5,729,628 | A | * | 3/1998 | Tokuyama ................... 382/173 |
| 6,417,886 | B1 | * | 7/2002 | Tariki ....................... 348/384.1 |
| 6,546,188 | B1 | * | 4/2003 | Ishii et al. ...................... 386/52 |
| 6,631,241 | B2 | * | 10/2003 | Yamauchi et al. ............. 386/95 |

2003/0118974 A1    6/2003    Obrador

FOREIGN PATENT DOCUMENTS

EP    1 168 840 A2    1/2002

OTHER PUBLICATIONS

Kuwano et al., "Telop-on-demand: Video structuring and retrieval based on text recognition", IEEE, 2000, pp. 759-762.  
Kawashima et al., "Indexing of Baseball Telecast for Content-based Video Retrieval", IEEE, 1998, pp. 871-874.  
Morozumi, Satoshi et al., "Automatic Indexing and Summary Generation for Baseball Scenes Based on Telop Information," Institute of Image Electronics Engineers of Japan Paper Feb. 7, 1933, p. 205.

* cited by examiner

*Primary Examiner*—John Miller  
*Assistant Examiner*—Christopher Onuaku  
(74) *Attorney, Agent, or Firm*—Drinker Biddle & Reath LLP

(57) ABSTRACT

This invention provides a data-recording/reproduction apparatus that creates hierarchical-structured video data for partial contents data based on telops, and that is capable of easily and accurately reproducing a summary searching for an arbitrary scene in contents data desired by the user. The data-recording/reproduction apparatus 100 detects change locations in extracted telop data, and when at least two or more change locations are detected from one or two or more telop data, it detects the number of changes and point of change at each detected change location. Also, the data-recording/reproduction apparatus 100 sets hierarchical levels for each change location based on the detected change locations and number of changes, and together with generating index data the indicates a plurality of scenes in the contents data based on the set hierarchical levels and detected points of change of for each change location, it reproduces contents data based on the generated index data.

13 Claims, 8 Drawing Sheets

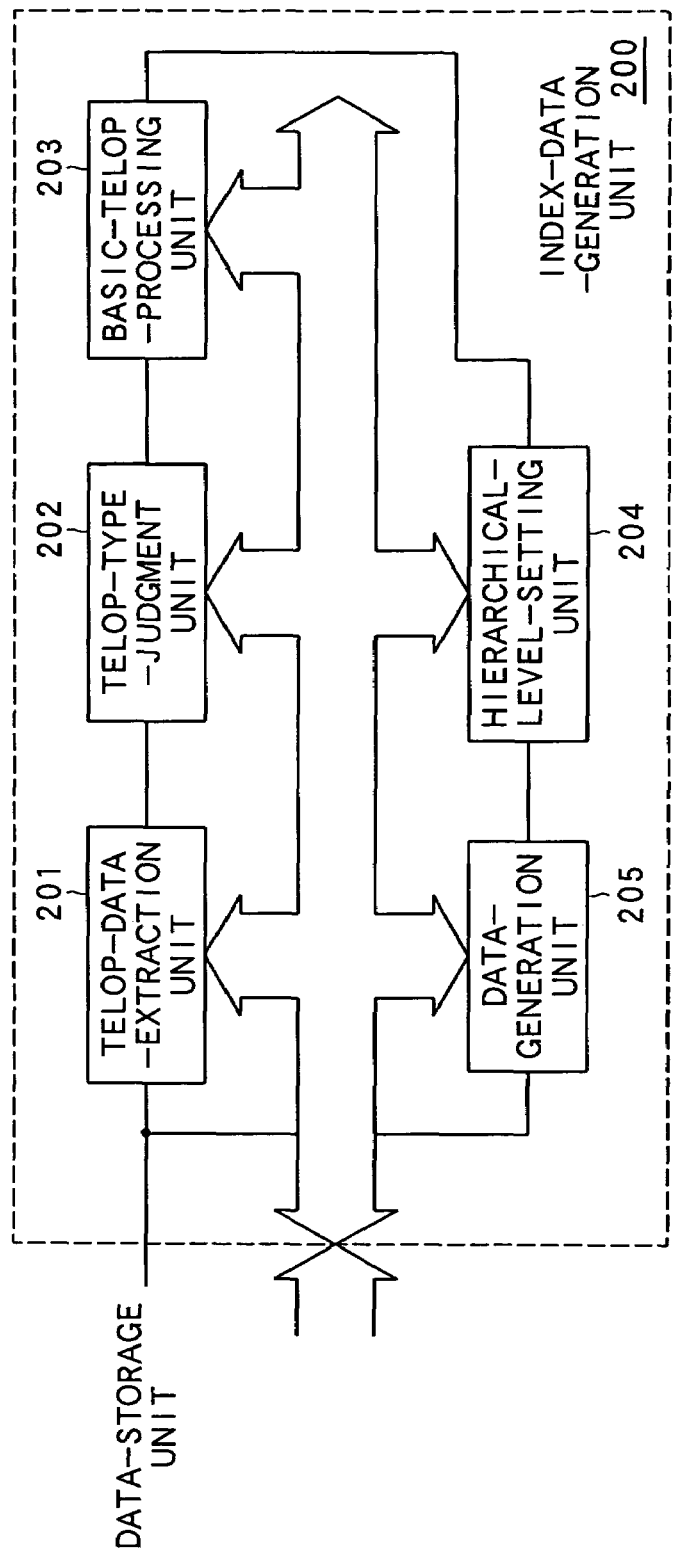

EXTRACTED TELOP DATA

FIG. 4

| TYPE INFORMATION | FRAME INFORMATION | LEVEL INFORMATION | REPRESENTATIVE-IMAGE DATA FILE NAME |
|---|---|---|---|
| a1a | 120 | 3 | Telop_A1A.gif |
| a2c | 370 | 1 | Telop_A2C.gif |
| a1a | 500 | 4 | Telop_B01.gif |
| ∼ | ∼ | ∼ | ∼ |
| a5b | 1205 | 5 | Telop_A5B.gif |
| b | 1430 | 4 | Telop_B02.gif |
| a2b | 2000 | 1 | Telop_A2B.gif |
| ∼ | ∼ | ∼ | ∼ |
| c | 65503 | 5 | Telop_C01.gif |

INDEX DATA GENERATION APPARATUS, INDEX DATA GENERATION METHOD, INDEX DATA GENERATION PROGRAM AND RECORDING MEDIUM ON WHICH THE PROGRAM IS RECORDED

BACKGROUND OF THE INVENTION

1. Field of the Invention

This invention relates to a contents data recording/reproduction apparatus that generates index data for the contents data, and generates contents data based on the generated index data.

2. Description of the Related Art

In recent years, as recording apparatuses such as a VTR (video tape recorder) that records or reproduces data such as that of a program from a television broadcast have become widely spread, performing a summary reproduction that provides a summary in a short period of time of the contents data without having to watch all of the recorded contents has been employed.

Conventionally, as methods for performing this kind of summary reproduction, there is a method of performing summary reproduction by paying attention to the audio data that accompanies the contents data, and a method of performing summary reproduction by mainly paying attention to the video data itself. Particularly, the summary reproduction method that performs summary reproduction by paying attention to the video data itself is such that it recognizes telop text that indicates the contents of the time progression that are presented in the main image data of the video, and identifies the contents of the images of each part of the main image data based on that recognized text, then performs a summary reproduction based on the identified partial image data (see; Institute of Image Electronics Engineers of Japan Paper 02-07-33, "Auto-Indexing and Summary Generation of the Baseball Season Driven by Telop")

However, in the conventional method of performing summary reproduction using telop, a plurality of partial image data in the main image data is identified based on information in a recognized telop, and an index for the contents data is set based on the identified partial image data.

Therefore, in that summary method, the relationships between partial image data, such as the importance occupied in the entire video data by each partial image data that was identified by the index, were not displayed, and it was not possible to easily search for arbitrary scenes in the contents data desired by the user based on the generated index.

SUMMARY OF THE INVENTION

Taking the inconveniences mentioned above into consideration, the object of this invention is to provide an index data generation apparatus that puts partial image data into a hierarchical structure based on the telop, and makes it possible to easily perform summary reproduction or execute a search for an arbitrary scene in the contents data desired by the user, and to provide a data recording/reproduction apparatus that performs reproduction based on that data.

The above object of the present invention can be achieved by an index data generation apparatus of the present invention. The index data generation apparatus is provided with: an acquisition device which acquires contents data that contains video data which includes at least a preset time length video data; an extraction device which extracts sub-image data, that is image data that aids contents of the main-image data that changes over time, from the main-image data that indicates the acquired video data; a first detection device which detects partial image data that indicates the areas of change in the images of the extracted sub-image data; a second detection device which detects the number of changes and points of change in each detected partial image data when at least two or more the partial image data are detected from one or two or more the sub-image data by the first detection device; a setting device which sets hierarchical levels for each partial image data based on the number of changes of the detected partial image data; and a generation device which generates index data that indicates a plurality of scenes in the contents data based on the hierarchical levels of each the detected partial-image data and points of change in each the detected partial-image data.

According to the present invention, the data recording/reproduction apparatus is capable of generating index data from contents data for which a hierarchical level is set based on points of change in telop data that aids the contents of the contents data that changes over time, and is able to reproduce the contents data based on the generated index data. Therefore, the data recording/reproduction apparatus is able to generate index data that accurately shows the contents of the contents data, and is able to reproduce the contents data based on that generated index data, so it is possible for the user to detect and reproduce desired scenes easily and accurately.

In one aspect of the present invention can be achieved by the index data generation apparatus of the present invention. The index data generation apparatus of the present invention is, wherein the setting device sets the partial-image data having a small number of the changes to a higher hierarchical level than partial-image data having a large number of changes.

According to the present invention, in contents data, change locations in the telop data having a small number of changes, such as telop data that indicates the score of both teams in a baseball broadcast, indicate important contents, and points where the change locations change are often important scenes in the contents data. Therefore, the data recording/reproduction apparatus able to generate index data that accurately shows the contents of the contents data, and is able to reproduce the contents data based on the generated index data, so it is possible for the user to detect and reproduce desired scenes easily and accurately.

In another aspect of the present invention can be achieved by the index data generation apparatus of the present invention. The index data generation apparatus of the present invention is, wherein the second detection device is provided with an image-acquisition device of acquiring the sub-image data at the points of change when detecting points of change in the detected partial-image data; and the generation device generates the index data and correlates it with the acquired sub-image data.

According to the present invention, when the data recording/reproduction apparatus reproduces contents data based on index data, it is possible for the user to check a desired scene whose contents change using the image data of telop data, so it is possible for the user to detect and reproduce desired scenes easily and accurately.

In further aspect of the present invention can be achieved by the index data generation apparatus of the present invention. The index data generation apparatus of the present invention is, wherein when the extraction device extracts two or more the sub-image data, the first detection device is provided with a sorting device which sorts the type of the sub-image data into first sub-image data, which is sub-image data for which an area of change should be detected in the partial-image data, and second sub-image data, which is other sub-image data, based on the total display time of the entire contents data of the each sub-image data, and detects partial-image data in the sorted first sub-image data.

According to the present invention, the data recording/reproduction apparatus is capable of deleting telop data (event telop data) that does not accurately show the contents of the contents data, and is able to generate index data based on the telop data that accurately shows the contents of the contents data, so it is possible to generate index data that accurately shows the contents of the contents data, and it is possible for the user to detect and reproduce desired scenes easily and accurately.

In further aspect of the present invention can be achieved by the index data generation apparatus of the present invention. The index data generation apparatus of the present invention is, wherein the setting device is provided with a calculation device which calculates a change interval that indicates the interval between each change in the area of change in the first sub-image data sorted by the sorting device, and sets the hierarchical levels for each partial-image data of first sub-image data based on each the calculated change interval and the number of appearances of the second sub-image data sorted by the sorting device in the change interval.

According to the present invention, the data recording/reproduction apparatus is able to also include spot telop data (event telop data) that does not accurately show the contents of the contents data in the index data, so it is possible for the user to generate index data that makes it possible to even more easily search for a desired scene.

In further aspect of the present invention can be achieved by the index data generation apparatus of the present invention. The index data generation device of the present invention is, wherein the setting device sets hierarchical levels for the second sub-image data that is sorted by the sorting device.

According to the present invention, the data recording/reproduction apparatus is able to also include spot telop data (event telop data) that does not accurately show the contents of the contents data in the index data, so it is possible for the user to generate index data that makes it possible to even more easily search for a desired scene.

The above object of the present invention can be achieved by a contents data reproduction apparatus of the present invention. The contents data reproduction apparatus is provided with: an acquisition device which acquires contents data having at least video data; an extraction device which extracts sub-image data from the main-image data that indicates the acquired video data and that is image data that aids contents of the main-image data that changes over time; a first detection device which detects partial image data that indicates the areas of change in the images of the extracted sub-image data; a second detection device which detects the number of changes and points of change in each detected partial image data when at least two or more the partial image data are detected from one or two or more the sub-image data by the first detection device; a setting device which sets hierarchical levels for each partial-image data based on the number of changes of the detected partial-image data; a generation device which generates index data that indicates a plurality of scenes in the contents data based on the hierarchical levels of each the detected partial-image data and points of change in each the detected partial-image data; and a reproduction device which reproduces the contents data based on the generated index data.

According to the present invention, the data recording/reproduction apparatus is capable of generating index data from contents data for which a hierarchical level is set based on points of change in telop data that aids the contents of the contents data that changes over time, and is able to reproduce the contents data based on the generated index data. Therefore, the data recording/reproduction apparatus is able to generate index data that accurately shows the contents of the contents data, and is able to reproduce the contents data based on that generated index data, so it is possible for the user to detect and reproduce desired scenes easily and accurately.

The above object of the present invention can be achieved by an index data generation method of the present invention. The index data generation method is provided with: an acquisition process of acquiring contents data that contains at least video data; an extraction process of extracting sub-image data from the main-image data that indicates the acquired video data and that is image data that aids contents of the main-image data that changes over time; a first detection process of detecting partial image data that indicates the areas of change in the images of the extracted sub-image data; a second detection process of detecting the number of changes and points of change in each detected partial image data when at least two or more the partial image data are detected from one or two or more the sub-image data by the first detection process; a setting process of setting hierarchical levels for each partial-image data based on the number of changes of the detected partial-image data; and a generation process of generating index data that indicates a plurality of scenes in the contents data based on the hierarchical levels of each the detected partial-image data and points of change in each the detected partial-image data.

According to the present invention, the data recording/reproduction apparatus is capable of generating index data from contents data for which a hierarchical level is set based on points of change in telop data that aids the contents of the contents data that changes over time, and is able to reproduce the contents data based on the generated index data. Therefore, the data recording/reproduction apparatus is able to generate index data that accurately shows the contents of the contents data, and is able to reproduce the contents data based on that generated index data, so it is possible for the user to detect and reproduce desired scenes easily and accurately.

BRIEF DESCRIPTION OF THE DRAWINGS

FIG. 2 is a block diagram showing the construction of the index data generation unit of the editing system of an embodiment of the invention;

FIG. 4 shows an example of the data structure of index data generated by the index data generation unit;

DESCRIPTION OF THE PREFERRED EMBODIMENTS

Next, the preferred embodiments of the invention will be explained based on the drawings.

Each of the embodiments explained below is an embodiment in which the contents data reproduction apparatus or index data generation apparatus of this invention is applied to a data recording/reproduction apparatus.

More specifically, the data recording/reproduction apparatus of these embodiments record video data (hereafter referred to as simply contents data), which are contents data comprising input audio data and video data, in advance, and generates index data for executing the selection and reproduction of a scene in the recorded contents data desired by the user based on text, symbols and other sub-image data (hereafter referred to as the telop data) that indicate changes over time included in the main image data that indicate this recorded video data.

Particularly, when generating index data, the data recording/reproduction apparatus of these embodiments generates index data having a specified hierarchical structure, then correlates the generated index data with the contents data and provides it to the user.

Also, when a scene is specified based on the generated index data, this data recording/reproduction apparatus searches the contents data for the specified scene and performs reproduction of that specified scene (hereafter referred to as Random Access).

In these embodiments, a data recording/reproduction apparatus that generates this kind of index data and performs reproduction of the contents data according to that generated index data will be explained.

Figure 1:
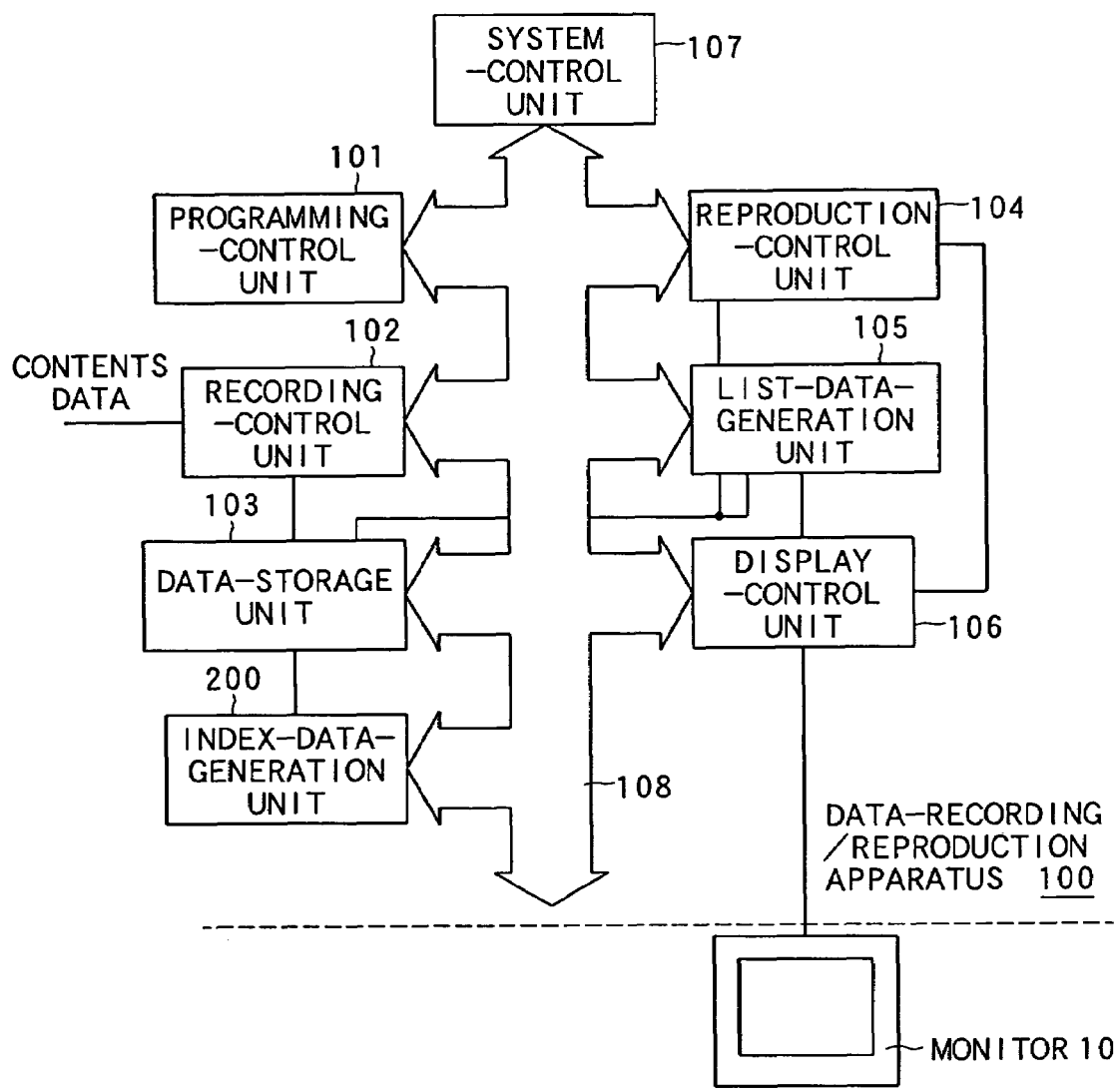
FIG. 1 is a block diagram showing the system construction of the editing system of an embodiment of the invention.

First, FIG. 1 will be used to explain the construction of the data recording/reproduction apparatus of an embodiment of the invention.

FIG. 1 is a block diagram of the system construction of the editing system of the embodiment.

As shown in FIG. 1, the data recording/reproduction apparatus 100 of this embodiment is provided with: a programming control unit 101 that programs recording of the contents data based on an instruction that is input from the user by way of a control unit (not shown in the figure); a recording control unit 102 that controls the recording of the contents data input according to an instruction from the programming control unit 101 or control unit (not shown in the figure); a data storage unit 103 that stores contents data; an index data generation unit 200 that generates index data for the stored contents data; a reproduction control unit 104 that controls the reproduction of the contents data, and when random access is performed, controls the random access of contents data based on the generated index data; a list data generation unit 105 that generates a list of data (hereafter referred to as list data) that corresponds with the contents data of the index data; a display control unit 106 that controls the display of the contents data on an external monitor 10, and when performing random access, overlays and displays the generated list data and contents data; and a system control unit 107 that controls all of the components of the data recording/reproduction apparatus 100; and where all of the components are connected to each other via a bus 110.

For example, the reproduction control unit 104 of this embodiment functions as the acquisition means of the invention; and the index data generation unit 200 functions as the extraction means, first detection means, second detection means, setting means, generation means, image-acquisition means, sorting means and calculation means of this invention.

The user inputs an instruction to the programming control unit 101 by way of a control unit (not shown in the figure), and this programming control unit 101 sets information such as the broadcast station, date and time and the like based on the instruction input by the user, and controls the recording control unit 102 and receiving unit (not shown in the figure) by way of the system control unit 107 based on the set information.

More specifically, this programming control unit 101 controls the receiving unit (not shown in the figures) that receives broadcast signals that are sent from broadcast stations such that it selects a specified broadcast station at a specified time based on the set information, and sends an instruction to the recording control unit 102 to record the received contents data.

Contents data that are output from the receiving unit (not shown in the figure) having a specified format are input to the recording control unit 102, and in the case of a digital broadcast, program arrangement information (hereafter referred to as SI (Service Information)) received by the receiving unit (not shown in the figure) is input.

Also, the recording control unit 102 converts the video data of the input contents data to MPEG format, and converts the audio data related to the input contents data to AC 3 format, and generates a program stream from each converted format, then outputs the generated program stream to a data storage unit 103.

Moreover, when SI information is input by receiving a digital broadcast, this recording control unit 102 extracts EIT (Event Information Table) information that is contained in the SI information from that SI information, and determines whether or not to generate index data from the received EIT information, and when it determines to generate index data, it causes the index data generation unit 200 by way of the system control unit 107 to generate index data.

More specifically, the recording control unit 102 determines whether or not the contents data received from the EIT information is a sports genre having changes over time such as baseball or soccer, and when it determines that it is a sports genre having changes over time, it records the contents data of that broadcast program that has been programmed for recording, and then sends an instruction to the index data generation unit 200 to generate index data.

For example, for a BS (Broadcasting Satellite) digital broadcast or CS (Communication Satellite) digital broadcast, SI information is sent together with the contents data of the TV program from the satellite to home-based television-broadcast receivers, or in other words, to the receiving unit (not shown in the figure) of this embodiment, and when the receiving unit receives that SI information, that SI information is input to the recording control unit 102.

The data storage unit 103 is provided with a recording medium such as a hard disc (hereafter referred to as the HD), and based on control from the recording control unit 102, it stores the contents data that are output from the recording control unit 102 on the HD using a specified format. Also, this data storage unit 103 correlates the generated index data (to be explained later) with the contents data and stores that index data on the HD.

More specifically, the program stream that is generated by the recording control unit 102 and the index data that are generated by the index data generation unit 200 are input to the data storage unit 103, and this data storage unit 103 stores the input program stream on the HD and correlates the index data with the contents data and stores that index data.

Moreover, when performing reproduction or random access of the contents data, the data storage unit 103 reads a pre-recorded program stream or that program stream and index data from the HD according to an instruction from the reproduction control unit 104, and outputs them to the reproduction control unit 104.

The data structure of the index data stored in the data storage unit 103 of this embodiment will be described in detail later.

Contents data that are already stored in the data storage unit 103 are input to the index data generation unit 200, and this index data generation unit 200 extracts the telop (hereafter referred to as telop data) that indicates sub-image data, which is part of the main image data of the video data of the contents data, and sets ID data and other information for that telop data.

Also, this index data generation unit 200 sorts the extracted telop data into a plurality of types based on preset conditions, and generates index data having hierarchical levels based on that sorted telop data, then outputs the generated index data to the data storage unit 103.

Details about the index data generation unit of this embodiment and the operation of the generation process for generating the index data will be described later.

A reproduction instruction or random access instruction is input to the reproduction control unit 104 from the control unit (not shown in the figure) by way of the system control unit 107, and based on the instruction put from the control unit, this reproduction control unit 104 reads the stored contents data or the contents data and index data having a specified format from the data storage unit 103.

Also, this reproduction control unit 104 converts the format of the read contents data and outputs it to the display control unit 106, and when reading index data, outputs that index data to the list data generation unit 105.

That is, according to an instruction that is input from the control unit, the reproduction control unit 104 reads the program stream that is related to the contents data to be reproduced, and converts it to video data having MPEG format and audio data having AC 3 format, then outputs the data in each converted format to the display control unit 106.

The reproduction control unit 104 of this embodiment performs various reproduction controls according to control instructions that are input from the control unit (not shown in the figure). Also, in this embodiment, when audio data is contained in the contents data, the reproduction control unit 104 outputs the audio data direct to the monitor 10 from the reproduction control unit 104.

When performing random access of contents data, the index data for the contents data that will be the object of the random access is input to the list data generation unit 105, and this list data generation unit 105 generates image data (hereafter referred to as list data) for the index data to be displayed on the externally connected monitor 10 based on the input index data, and outputs that generated list data to the display control unit 106.

The list data that is generated by the list data generation unit 105 of this embodiment will be described in detail later.

Contents data having a specified format is input to the display control unit 106, and this display control unit 106 generates display data to be displayed on the externally connected monitor 10 based on an instruction from the system control unit 107, and temporarily saves that display data in an internal buffer memory, then at specified timing, reads the display data from the buffer memory and outputs it to the monitor 10.

Also, when performing random access, the list data that is generated by the list data generation unit 105 is input to the display control unit 106 together with the contents data, and in this case, this display control unit 106 generates display data with the contents data and list data overlapped, and outputs it to the externally connected monitor 10.

The system control unit 107 mainly is provided with a central processing unit (CPU), and based on instructions from the user that are input by way of the control unit (not shown in the figures), it performs overall control of the general functions for the recording process of recording contents data, the reproduction process and random access reproduction process.

The system control unit 107 reads a control program that is stored in ROM (not shown in the figure) and executes each process, then temporarily stores the data during processing in RAM (not shown in the figure) and controls all of the operation of the data recording/reproduction apparatus 100.

Next, FIG. 2 to FIG. 4 will be used to explain in detail the construction of the index data generation unit of this embodiment.

Figure 3A:
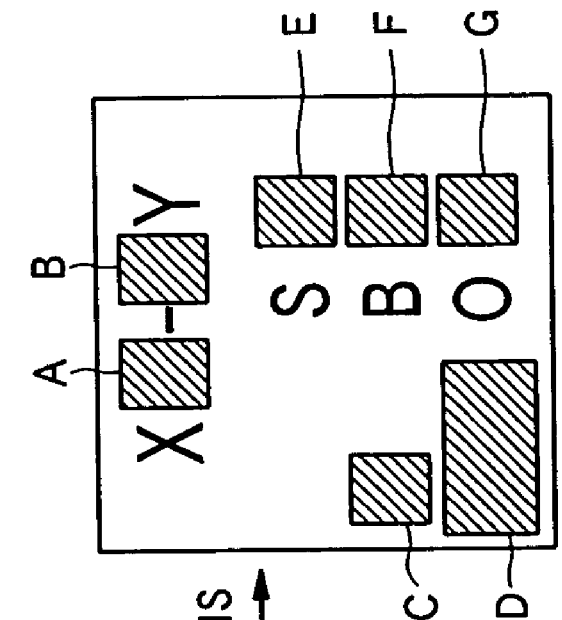
FIG. 3A shows an example of the basic telop data that was extracted by a telop data extraction unit and having a plurality of change locations.
Figure 3B:
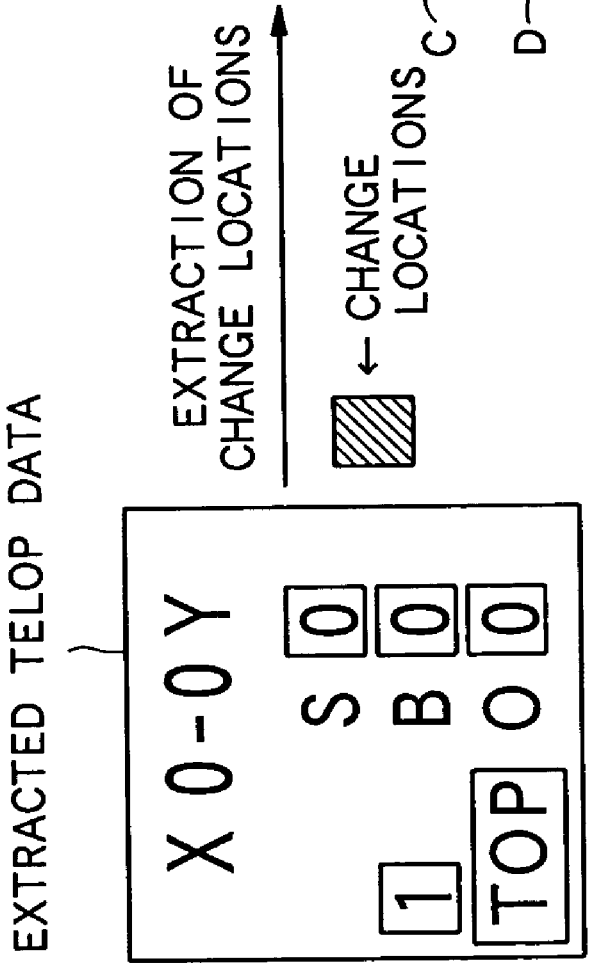
FIG. 3B shows an example of the basic telop data that was extracted by a telop data extraction unit and having a plurality of change locations.

FIG. 2 is a block diagram showing the construction of the index data generation unit of the editing system of this embodiment, and FIGS. 3A and 3B is an example of the extracted basic telop data having a plurality of changed portions. Also, FIG. 4 is an example of the data structure of the index data generated by the index data generation unit.

As described above, the index data generation unit 200 of this embodiment extracts the main image data in the contents data, or in other words, extracts the telop data that indicates the sub-image data of the main image data in the video data of the contents data, and sets ID information and other information for that telop data, then sorts the extracted telop data into a plurality of types based on preset conditions and generates index data having hierarchical levels based on the sorted telop data.

Normally, in the case where the contents data is for a relayed broadcast of a sports competition such as baseball or soccer, in order to quickly show the viewer the progression of the game and score, sub-image data, which is partial image data called telop and that is provided with text, symbols and other images, is contained in the video data of the contents data in addition to the main image data showing the contents of the game.

In the case where the contents data is for a baseball game, this telop accurately provides the viewer with the number of the inning, the scores for both teams, the out count, etc. Therefore, often changes in this telop display indicate divisions in the contents of the game such as when the score changes, or when there is a change in offense and defense, or the like.

Therefore, in this embodiment, the index data generation unit 200 takes notice of this telop and generates index data based on the number of times the telop changes.

As shown in FIG. 2, this index data generation unit 200 is provided with: a telop data extraction unit 201 that extracts the telop data contained in the main image data of the contents data; a telop type judgment unit 202 that sorts the telop when generating index data into basic telop data (hereafter called basic telop) and telop data that is not basic telop data (hereafter called event telop data) when there is a plurality of input telop types; a basic telop processing unit 203 that sets the locations in the basic telop data that change; a hierarchical level setting unit 204 that sets the hierarchical levels for the event telop data and sets the hierarchical levels for each of the change locations in the basic telop data; and a data generation unit that generates index data based on each of the extracted telop data and set hierarchical data.

For example, the telop data extraction unit 201 of this embodiment functions as the extraction means and image-acquisition means of the invention, and the basic telop processing unit 203 functions as the first detection means and second detection means of the invention. Also, for example, the hierarchical level setting unit 204 of this embodiment functions as the setting means and calculation means of the invention, and the data generation unit 205 functions as the generation means of the invention. Furthermore, the telop type judgment unit 202 functions as the sorting means of the invention.

Video data that is separated from the contents data output from the data storage unit 103 by way of the reproduction control unit 104 is input to the telop data extraction unit 201, and this telop data extraction unit 201 uses a specified method to extract the telop data, which is the sub-image data, from the main image data in the input video data.

More specifically, by performing a binarization process on the main image data input for each frame, the telop extraction unit 201 estimates the image data for the telop portion contained in that main image data, and taking the sub-image data, which is the image data of the estimated telop portion, the starting frame and ending frame of the contents data of each telop portion (hereafter referred to as the frame information), and the position information of the sub-image data of the estimated telop portion of the entire input main-image data, as telop data, assigns ID information in order from the start of the contents data and outputs it to the telop type judgment unit 202.

For example, in this embodiment, this telop data extraction unit 201 performs binarization processing for each frame of main image data in the contents data, and estimates the image portion of the telop portion by detecting the edge of the image portion that is not the telop portion, such as the image portion or background image data of the telop portion, or by detecting the color distribution of the image data.

When detecting the edge of the image portion of the telop portion and the image portion that is not the image portion of the telop portion, the telop data extraction unit 201 detects that edge by determining whether or not the detected edge appears stable over several frames.

Also, normally, since the telop data is not limited to being constantly displayed in the contents data, in this embodiment, the telop data extraction unit 201 extracts the frame where the telop display started as the starting frame and the frame where that telop display ended as the ending frame, and extracts the image data for each frame of the telop portion from the starting frame to the ending frame, and together with ID information for identifying the position information, the frame information and other telop data, outputs the image data from the starting frame to the ending frame as one set of telop data to the telop type judgment unit 202.

The telop data that was extracted by the telop data extraction unit 201 is input to the telop type judgment unit 202, and this telop type judgment unit 202 sorts the input telop data into basic telop that become the basis when generating index data, and event telop that is not the basic telop, and outputs the telop data that belongs to the basic telop data to the basic telop processing unit 203, and outputs the telop data that belongs to the event telop data to the hierarchical level setting unit 204.

More specifically, the telop type judgment unit 202 sorts the telop data that is displayed in the same location in the entire main image data into telop data groups of the same type based on position information indicating the position of the entire main-image data of the image data for each frame of the input telop data.

Also, this telop type judgment unit 202 calculates the total display time for the entire contents data related to the image data of the telop for each type of sorted telop data (hereafter referred to as the telop data group), and based on this total display time, sets the type of each telop data group, or in other words, sorts all of the types of telop data groups and sets information indicating each type (hereafter referred to as type information).

For example, in this embodiment, this telop data type judgment unit sorts the telop data group with the longest display time as one basic telop, and other telop data groups, or in other words, telop data groups having a display time shorter than the basic telop data group as event telops for each of the same telop positions in the main image data.

For example, in the case where the contents data is a relayed broadcast of a baseball game, when telop image data, which is a collection of information related to the game such as the number of innings indicating a change in offense or defense, the score for both teams, and the out count, is displayed, the display time of the telop data group that is a collection of this information becomes the longest, so that telop data group corresponds to the basic telop, and other telops, for example, a telop data group that shows the batter's name and his record correspond to event telop data.

The basic telop determined by the telop type judgment unit 202, or in other words the telop data to which basic telop type information is added, is input to the basic telop processing unit 203, and this basic telop processing unit 203 identifies the locations in the image data of each input basic telop data where the display changes over time (hereafter referred to as change locations), and based on the number of times there were changes in each of the identified change locations, it sets an approximate hierarchical level for each change location in the basic telop data.

More specifically, the basic telop processing unit 203 performs binarization processing for each input telop data and on image data of the telop data for each frame, and identifies the change locations in the telop data of that basic telop data group.

Also, this basic telop processing unit 203 extracts the image data (hereafter referred to a representative image data) in the frame at the time of change of each change location, and sets flag data for each change location indicating that that the change location in the basic telop data group has changed.

Furthermore, this basic telop processing unit 203 calculates the number of times there are changes in each change location based on the flag data set as described above, and sets the change locations having a small number of calculated changes as change locations in a high hierarchical level, and sets the height of the hierarchical level for each change location in the order of change locations with a low number of changes.

For example, in the case where the contents data is a relayed broadcast of a baseball game, when the basic telop data group such as shown in FIGS. 3A and 3B is extracted, the basic telop processing unit 203 of this embodiment identifies each of the change locations A to G based on the binarization process, then calculates the number of changes in the entire basic telop data for each change location A to G based on the flag data for the change locations, and sets the hierarchical level for each change location with a higher hierarchical level set the fewer the number of changes of the change location.

Also, in this case, or in other words, in the case of contents data for a baseball game, when the basic telop data group as shown in FIGS. 3A and 3B is extracted, the basic telop processing unit 203 sets change locations A and B as change locations having the highest hierarchical level since they show the score of each team during the game, sets change location C, which shows the number of the inning, as the next hierarchical level, sets change location D, which shows the top or bottom of the inning for each inning, or in other words changes in offense and defense, as the hierarchical level below change location C, sets change location G, which shows the out count, below change location D, and sets change locations E and F, which show the strike count and ball count, as the lowest hierarchical level.

On the other hand, based on the type information showing the type of telop that was set by the telop type judgment unit 202, the basic telop processing unit 203 sets type information for each representative image data at the time when each change location changes in order to identify representative image data when other change locations change, and together with frame information for the starting frame of each representative image data, outputs that representative image data to the hierarchical level setting unit 204.

More specifically, the basic telop processing unit 203 is able to distinguish event telop data, and sets type information for change locations and for each representative image data in order to be able to distinguish representative image data for which other hierarchical levels are set or representative image data for other change locations.

Also, as described above, this basic telop processing unit 203 outputs information for the approximate hierarchical levels (hierarchical level information) set for the change locations for each representative image data, together with the respective representative data to the hierarchical level setting unit 204.

This basic telop processing unit 203 uses numerical data to set hierarchical levels for each change location, and outputs the numerical data indicating the hierarchical level of each change location to the hierarchical level setting unit 204.

Representative image data in the basic telop data group at the time when the change location changes, and frame information and type information for that representative image data, as well as hierarchical level information for each change location in the basic telop data group, and event telop data for each type, or in other words, event telop data groups are input to the hierarchical level setting unit 204.

Based on the hierarchical levels for each change location in the input basic telop data group, this hierarchical level setting unit 204 sets the hierarchical levels of the input event telop data groups, and based on the set hierarchical levels of the event telop data groups, finally sets the hierarchical levels for each change location in each basic telop data group.

More specifically, when an arbitrary change location in the basic telop data group changes, the hierarchical level setting unit 204 determines whether or not there is event telop data of the same type.

In this embodiment, based on the type information for each starting frame of each event telop data in each event telop data group, this hierarchical level setting unit 204 compares the starting frame information of each input representative image data for which the same change locations change in time adjacent basic telop data groups, and calculates the number of times the event telop data in event telop data groups of the same type appear from the starting frame of each representative image data in an arbitrary change location of the basic telop data group that comes first in time, to the starting frame of the representative image data in the same change location of the basic telop data group that comes later in time.

For example, as shown in FIG. 3A and FIG. 3B, when event telop data of an event telop data group of an arbitrary type appears while the change location G in the basic telop data group changes, and when the change location E underneath change location G changes a plurality of times when the event telop data of that event telop data group appears, the hierarchical level setting unit 204 sets the hierarchical level of this event telop data group to the same hierarchical level as the change location G in the basic telop data group.

In other words, in the case where the contents data is a relayed broadcast of a baseball game, when image data showing the batter's name and record are displayed as event telop data groups of the same type, normally, the display of the event telop data groups does not change even when the image data for the strike count, which is a change location in the basic telop data group, changes. On the otherhand, in this case, while the same event telop data is being displayed, the change location of the out count, which is one hierarchical higher than the image data for the strike count, generally does not change. Therefore, in this case, the hierarchical level setting unit 204 sets the event telop groups showing this batter's name and record to the same hierarchical level as the hierarchical level of the change location that shows the out count.

When setting the hierarchical levels of each event telop group, the hierarchical level setting unit 204 of this embodiment uses the starting frame information that is set based on type information for the representative image data for which the same change locations in time adjacent basic telop data groups change.

As described above, this hierarchical level setting unit 204 sets information for the hierarchical levels set as described above (hereafter referred to as level setting information) for each change location of the basic telop data groups and event telop data groups, and together with the representative image data for each change location, the frame information for the starting frames, and the event telop data for each event telop group, outputs this level setting information to the data generation unit 205.

Basic telop data and event telop data for the representative image data for each set change location or for each event telop data group, the type information, level setting information indicating the hierarchical level and the frame information are input to the data generation unit 205, and based on the input data, this data generation unit 205 generates index data, and outputs the generated index data to the data storage unit 103.

For example, together with setting image data as the representative image data for when event telop data appears in each event telop data group, the data generation unit 205 collects the representative image data, type information, level information and frame information for the starting frames for the change locations of each basic telop data group and each event telop group, and generates index data as shown in FIG. 4.

In FIG. 4, the first alphabet letter of the type information indicates the type of basic telop group and event telop group, and combinations of the numbers and alphabet letters that follow it indicate the type of each change location in a basic telop data group.

Also, the event telop data of the event telop data group displays different image data, such as the batter's name and batting record, each time the main image data appears, so even when the type information is the same, different image data corresponds with the main image data. Moreover, the frame information gives information for the starting frame.

Next, FIG. 5 to FIGS. 7A and 7B will be used to explain the list data generated by the list data generation unit.

FIG. 5 to FIG. 7B show an example of list data generated by the list data generation unit 105 of this embodiment.

When performing random access of contents data, index data that is generated as described above and that will be the object of the random access is input to the list data generation unit 105, and based on the input index data, this list data generation unit 105 generates list data that show the image data of the index data that is to be displayed on the externally connected monitor 10, and outputs that generated index data to the display control unit 106.

Figure 5:
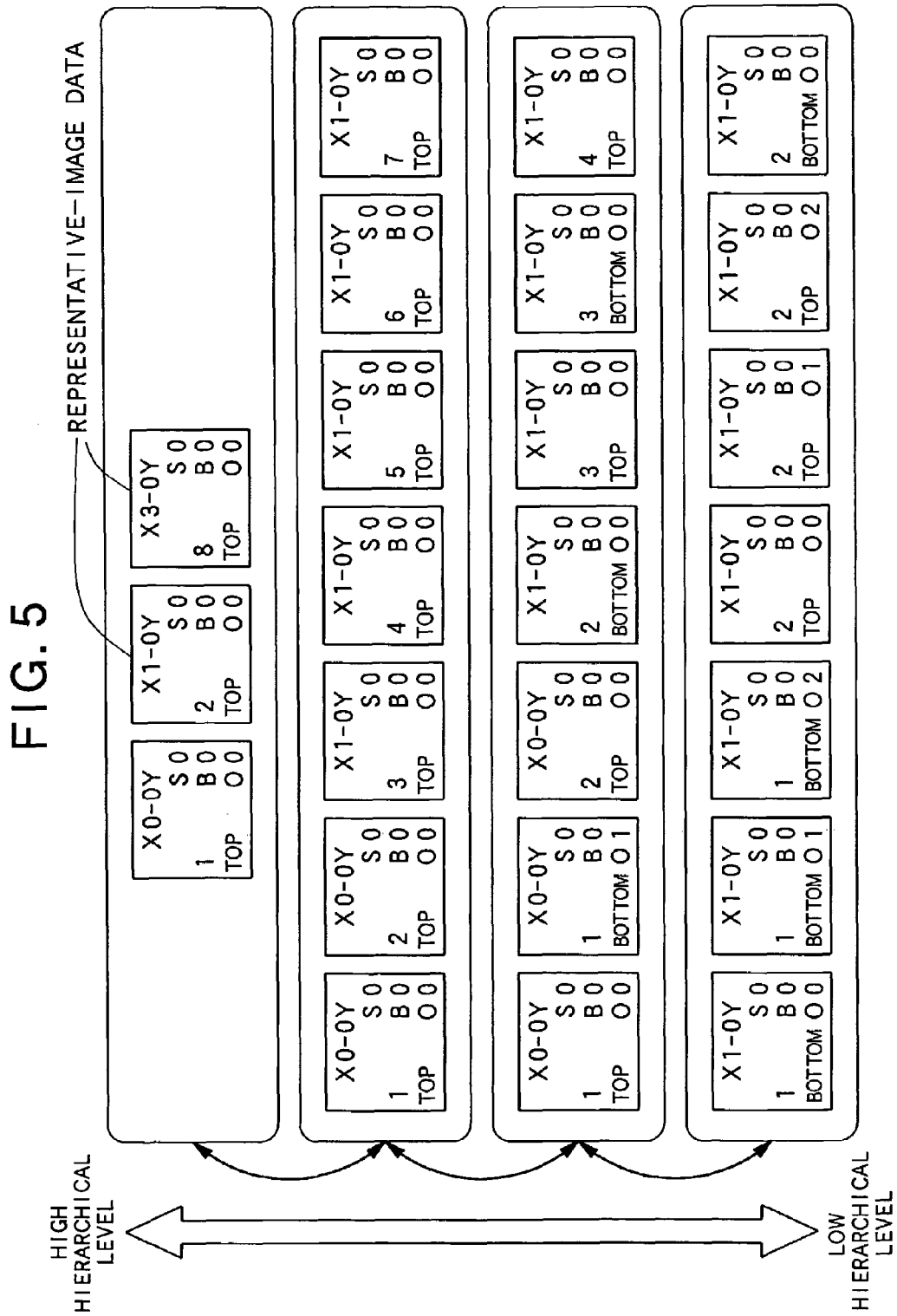
FIG. 5 is an example (I) of list data that is generated by the list data generation unit of an embodiment of the invention.

For example, when there is no event telop, in this embodiment, as shown in FIG. 5, the list data generation unit 105 generates list data that displays representative image data for the change locations in the basic telop data in the vertical direction based on the height of the hierarchical level, and based on the progression of time, generates list data that displays representative image data for each same hierarchical level in the horizontal direction.

Figure 6:
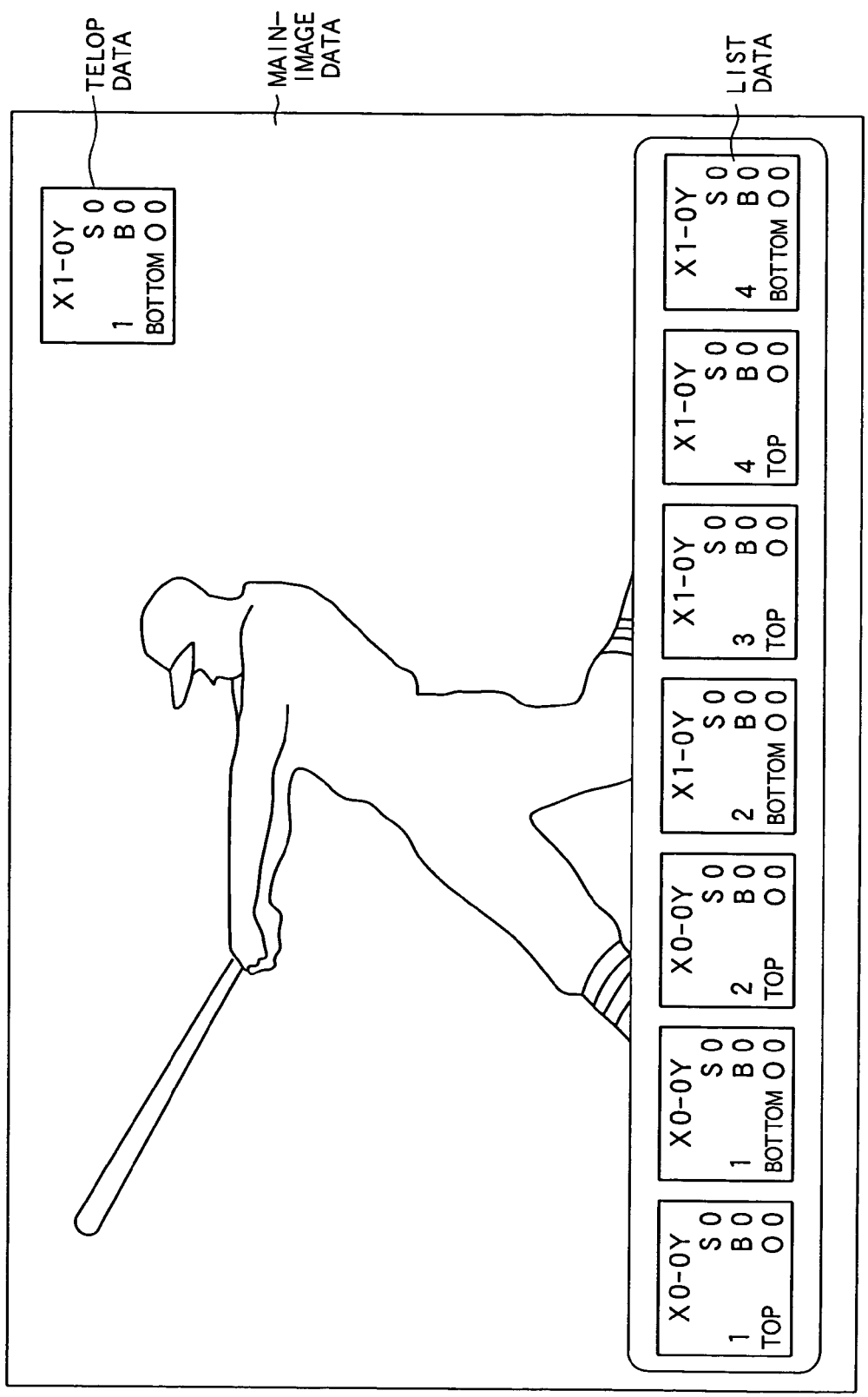
FIG. 6 is an example (II) of list data that is generated by the list data generation unit of an embodiment of the invention.

Also, in this embodiment, the list data generation unit 105 normally generates list data in order to display representative image data for an arbitrary hierarchical level, and when changing the height of the hierarchical level by control from a control unit (not shown in the figure), for example, generates list data for the hierarchical level selected according to that control as shown in FIG. 6, and outputs it to the monitor 10.

Figure 7A:
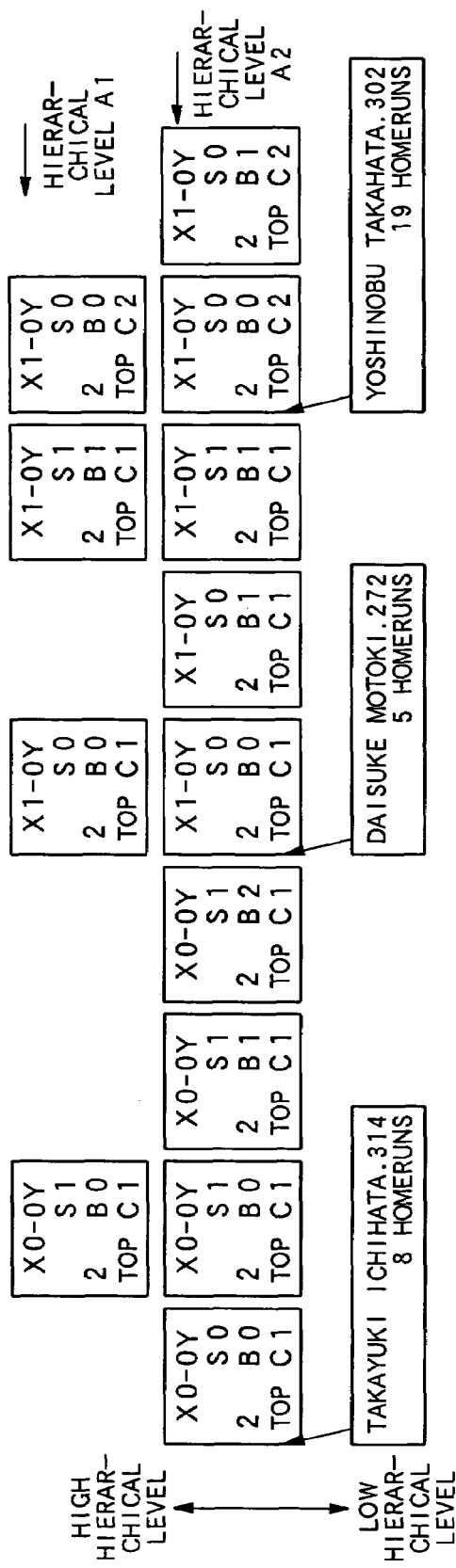
FIG. 7A shows an example (III) of list data that is generated by the list data generation unit of an embodiment of the invention.
Figure 7B:
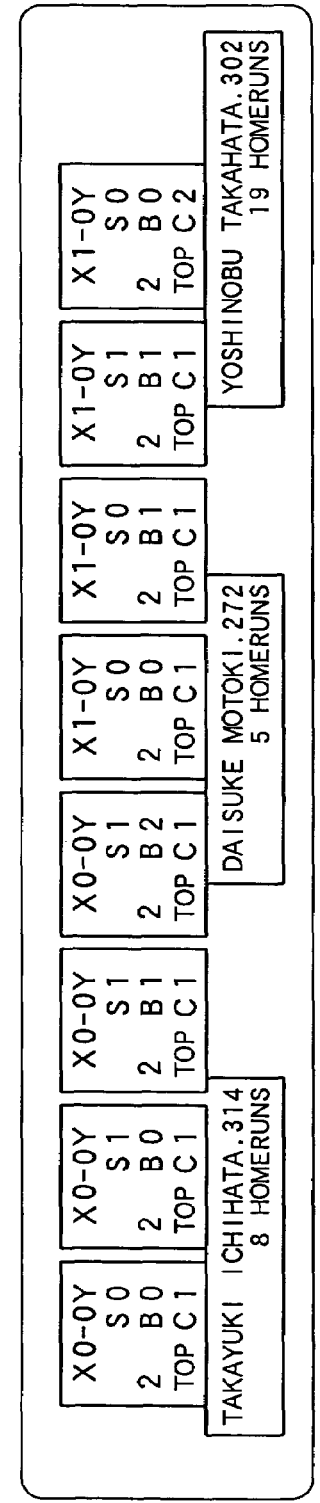
FIG. 7B shows an example (III) of list data that is generated by the list data generation unit of an embodiment of the invention.

On the other hand, as shown in FIG. 7A and FIG. 7B, in this embodiment, when there is an event telop, the list data generation unit 105 generates list data that displays representative image data for the change locations in the basic telop data or representative image data for event telop data in the vertical direction based on the height of the hierarchical level, and based on the time progression, generates list data that displays representative image data for each same hierarchical level in the horizontal direction.

As described above, FIG. 7A is list data that is generated when the hierarchical level of the event telop data is set to hierarchical level A, and FIG. 7B is list data that is generated when hierarchical level A is selected from the control unit (not shown in the figure).

Furthermore, the list data generation unit 105 generates list data so that it is possible to select or switch the list data that is output to the monitor 10 by way of the control unit (not shown in the figure), and when an arbitrary place in the list data is selected by way of the control unit (not shown in the figure), it outputs that instruction to the reproduction control unit 104.

Figure 8:
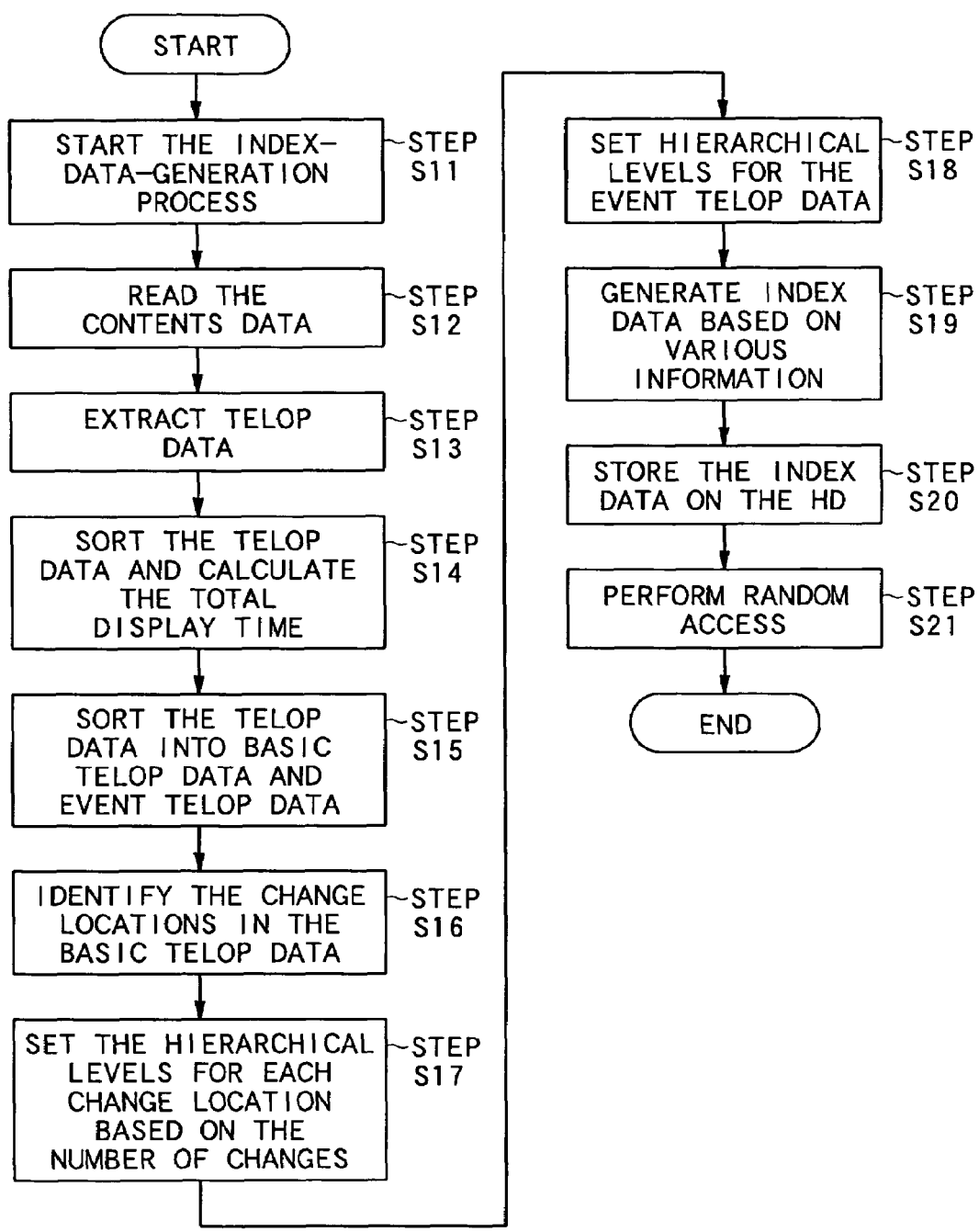
FIG. 8 is a flowchart showing the operation of the index data generation process of an embodiment of the invention.

Next, FIG. 8 will be used to explain the operation of the index data generation process by the index data generation unit 200 of this embodiment.

FIG. 8 is a flowchart showing the operation of the index data generation process of this embodiment. Also, in the operation, the contents data that is the object of index data generation is data that is already stored in the data storage unit 103.

First, based on EIT information, the recording control unit 102 determines whether or not to generate index data, and when an instruction to perform the process to generate that index data is input to the system control unit 107, or when an instruction is given from the control unit (not shown in the figure) to generate index data and input to the system control unit 107 such that the system control unit 107 performs the process of generating index data (step S11), that system control unit 107 controls the reproduction control unit 104 such that it reads the corresponding contents data from the data storage unit 103 and outputs the main image data for each frame of the read contents data to the telop data extraction unit 201 (step S12).

Next, after the main image data for each frame is input to the telop data extraction unit 201, that telop data extraction unit 201 extracts the sub-image data and frame information of the telop portion from the main image data as telop data (step S13).

More specifically, as described above, the telop data extraction unit 201 estimates the telop data contained in the main image data by performing binarization processing of the input main image data, and extracts the frame information and position information in the estimated sub-image data. Also, when doing this, the telop data extraction unit 201 assigns ID information to each estimated telop data and adds frame information to each sub-image data and outputs the data as telop data to the telop type judgment unit 202.

Next, after the estimated telop data is input to the telop type judgment unit 202, that telop type judgment unit 202 sorts the telop data based on the position information in each input telop data, or in other words, based on the display position of the sub-image data in the main image data, and calculates the total display time of the entire contents data of each telop data group (step S14).

Next, based on the calculated total display time, the telop type judgment unit 202 sets one telop data group as basic telop data, and the other telop data groups as event telop data, and outputs the set basic telop data to the basic telop processing unit 203, and outputs the set event telop data to the hierarchical level setting unit 204 (step S15).

When only one telop data group is input, the telop type judgment unit 202 sets that input telop data as the basic telop data.

Next, after the basic telop data is input to the basic telop processing unit 203, that basic telop processing unit 203 identifies the change locations in that basic telop data by performing binarization processing on the input telop data (step S16).

Next, the basic telop processing unit 202 calculates the number of changes for each identified change location and sets an approximate hierarchical level for each change location, then outputs level information indicating the approximate hierarchical levels for each change location to the hierarchical level setting unit 204, and also outputs type information for identifying representative image data at the time when each change location changes, the type of each change location and other representative image data, and frame information for each representative image data to the hierarchical level setting unit 204 for each representative data (step S17).

More specifically, when setting the approximate hierarchical levels for each change location, the basic telop processing unit 203 sets flag data for when a specified change location changed, and calculates the number of changes based on the flag data set for each change location, then sets the change locations with a low number of changes to a high order hierarchical level.

Next, event telop data is input, and after the representative image data, level information and other information are input, the hierarchical level setting unit 204 sets the hierarchical level for the event telop data, as well as sets hierarchical level for each change location in the basic telop data, and together with outputting each of the set hierarchical levels to the data generation unit 205 as level setting information, also outputs various information such as representative images for each change location or each event telop data to the data generation unit 205 (step S18).

More specifically, as described above, this hierarchical level setting unit 204 sets hierarchical levels for each event telop data by detecting whether or not event telop data having the same type appeared when an arbitrary change location in the basic telop data changed, and based on the hierarchical levels set for the event telop data, sets hierarchical levels for each change location in the basic telop data.

Next, the data generation unit 205 sets representative images for each event telop data based on the invention telop data, and generates index data based on the set representative image data and other input data (step S19).

Next, the data generation unit 205 outputs the generated index data to the data storage unit 103 by way of the reproduction control unit 104, and after the index data is input, the data storage unit 103 performs a specified process and stores the index data on a HD (step S22).

Finally, when an instruction is input to the system control unit 107 from the control unit (not shown in the figure) to perform random access of the contents data for which index data was generated, the system control unit 107 controls the reproduction control unit 104 to read the stored index data, and controls the list data generation unit 105 to generate list data for the read index data, and outputs that generated list data to the external monitor 10 (step S23).

At this time, when the reproduction control unit 104 is instructed by way of the control unit (not shown in the figure) to perform random access of an arbitrary scene based on the generated list data, it reproduces the contents data from the start of that scene.

The embodiment described above is provided with: a reproduction control unit 104 that acquires contents data having video data; a telop data extraction unit 201 that extracts telop data from the acquired video data, which is image data that aids the contents of the video data that changes over time; a basic telop processing unit 203 that detects change locations that indicate changed portions in the images of the extracted telop data; a basic telop processing unit 203 that detects the number of changes for each detected change location and detects the point of change in each detected change location when at least two or more change locations were detected from one or two or more telop data by the basic telop processing unit 203; a hierarchical level setting unit 204 that sets a hierarchical level for each change location based on the number of changes of each detected change location; and a data generation unit 205 that generates index data that gives an index for a plurality of scenes in the contents data based on the set hierarchical levels of each change location and the changed point of each detected change location; and where the reproduction control unit 104 reproduces contents data based on the generated index data.

With this construction, in this embodiment, the data recording/reproduction apparatus 100 detects change locations in extracted telop data, and when at least two or more change locations are detected from one or two or more telop data, it detects the number of changes of the detected change location and the point of change at each detected change location. Also, based on the number of changes of each detected change location, this data recording/reproduction apparatus 100 sets a hierarchical level for each change location, and based on the set hierarchical level of each change location and point of change of each detected change location, generates index data giving an index for a plurality of scenes in the contents data, and reproduces the contents data based on that generated index data.

In other words, in this embodiment, the data recording/reproduction apparatus 100 is capable of generating index data from contents data for which a hierarchical level is set based on points of change in telop data that aids the contents of the contents data that changes over time, and is able to reproduce the contents data based on the generated index data.

Therefore, the data recording/reproduction apparatus 100 of this embodiment is able to generate index data that accurately shows the contents of the contents data, and is able to reproduce the contents data based on that generated index data, so it is possible for the user to detect and reproduce desired scenes easily and accurately.

Also, in this embodiment, the hierarchical level setting unit 204 is constructed such that it sets the hierarchical level of change locations with a small number of changes higher than that of change locations with a large number of changes.

With this construction, in this embodiment, the data recording/reproduction apparatus 100 sets the hierarchical level of change locations with a small number of changes higher than that of change locations with a large number of changes.

Normally, in contents data, change locations in the telop data having a small number of changes, such as telop data that indicates the score of both teams in a baseball broadcast, indicate important contents, and points where the change locations change are often important scenes in the contents data.

Therefore, the data recording/reproduction apparatus 100 of this embodiment is able to generate index data that accurately shows the contents of the contents data, and is able to reproduce the contents data based on the generated index data, so it is possible for the user to detect and reproduce desired scenes easily and accurately.

Also, in this embodiment, when the basic telop processing unit 203 detects change points in the detected change locations, the telop data extraction unit 201 acquires the respective telop data for the change points, and the data generation unit 205 generates index data that corresponds to the acquired change points.

With this construction, in this embodiment, when the basic telop processing unit 203 detects change points in the detected change locations, the data recording/reproduction apparatus 100 acquires image data for the change points, and the data generation unit 205 generates index data that corresponds to the acquired image data.

Therefore, when the data recording/reproduction apparatus 100 of this embodiment reproduces contents data based on index data, it is possible for the user to check a desired scene whose contents change using the image data of telop data, so it is possible for the user to detect and reproduce desired scenes easily and accurately.

Moreover, in this embodiment, the data recording/reproduction apparatus 100 is constructed such that when the telop data-extraction unit 201 extracts two or more telop data, it has a telop type judgment unit 202 that based on the total display time of the entire contents data of each telop data, sorts the telop data into basic telop data, which is telop data for which the changed parts in the change locations are to be detected, and event telop data, which is telop data that is not basic telop data, and the basic telop processing unit 203 detects the changes in the first sorted telop data.

With this construction, in this embodiment, based on the total display time of the entire contents data in the telop data, the data recording/reproduction apparatus 100 sorts the telop data into basic telop data, which is telop data for which the changed parts in the change locations are to be detected, and event telop data, which is telop data that is not basic telop data, and detects the changes in the sorted basic telop data.

Normally, in the contents data, the telop data indicates the contents of the contents data, as well as often provides a display such as a player's name, the player's record and the like in the case of a broadcast baseball game.

Therefore, the data recording/reproduction apparatus 100 of this embodiment is capable of deleting telop data (event telop data) that does not accurately show the contents of the contents data, and is able to generate index data based on the telop data that accurately shows the contents of the contents data, so it is possible to generate index data that accurately shows the contents of the contents data, and it is possible for the user to detect and reproduce desired scenes easily and accurately.

Also, in this embodiment, the hierarchical level setting unit 204 is constructed such that it calculates the change interval that indicates the interval between each change in each changed portion of the first telop data sorted by the telop type judgment unit 202, and based on each calculated change interval and the number of appearances in each change interval of the second telop data sorted by the telop judgment setting unit 202, the hierarchical level setting unit 204 sets hierarchical levels for each change location in the first telop data.

With this construction, in this embodiment, the data recording/reproduction apparatus 100 calculates the change interval that indicates the interval between each change in each changed portion of the first telop data sorted by the telop type judgment unit 202, and based on each calculated change interval and the number of appearances in each change interval of the event telop data sorted by the telop judgment setting unit 202, it sets hierarchical levels for each change location in the first telop data.

Therefore, the data recording/reproduction apparatus 100 of this embodiment is able to also include spot telop data (event telop data) that does not accurately show the contents of the contents data in the index data, so it is possible for the user to generate index data that makes it possible to even more easily search for a desired scene.

Also, in this embodiment, the hierarchical level setting unit 204 is constructed such that it sets hierarchical levels for the event telop data sorted by the telop type judgment unit 202.

With this construction, the data recording/reproduction apparatus 100 of this embodiment is able to also include spot telop data (event telop data) that does not accurately show the contents of the contents data in the index data, so it is possible for the user to generate index data that makes it possible to even more easily search for a desired scene.

In this embodiment, when an arbitrary type of event telop data appears while a change location in an arbitrary basic telop data changes, and when a change location under that change location changes a plurality of times when that event telop data appears, the hierarchical level setting unit 204 is such that it sets the hierarchical level of this event telop data to the same hierarchical level as that change location, however, it is also possible to set the hierarchical level of this event telop to a hierarchical level below that change location.

In this case, when the change location of the basic telop data is set to a hierarchical level below that set hierarchical level, the hierarchical level setting unit 204 resets the hierarchical level of that change location to a hierarchical level below the higher event telop data.

In this embodiment, the basic telop processing unit 203 estimates each change location, and based on the changes at each change location, sets the hierarchical levels for each change location, however, it is also possible to prepare a template in advance for each genre of contents data, and to set the hierarchical level of change locations based on the prepared templates.

For example, in the case where the contents data is for a relayed broadcast of a baseball game, it is presumed that in the change locations of the telop data that while the number of innings changes once, the change location for indicating the top or bottom of the inning will change twice. Also, in this case where the contents data is for a relayed broadcast of a baseball game, in the change locations of that telop data, it is presumed that while the defense and offense changes, the out count will change two times. Therefore, the basic telop processing unit 203 can internally store these templates, then can read the templates when setting the hierarchical levels, and based on the number of changes of a detected change location, detect the meaning that gives the hierarchical level for each set change location and that change location. As a result, by setting the hierarchical level of each change location based on the meaning of the change location, the data recording/reproduction apparatus 100 is able to generate index data on which the hierarchical level is accurately reflected, and thus it is possible for the user to easily and accurately search for and reproduce a desired scene.

Also, in this embodiment, the data recording/reproduction apparatus 100 is not constructed to recognize text or other symbols, however, when setting the hierarchical levels for the change locations in the basic telop data, it is possible to construct it such that it can recognize the number '0' only. Normally, since the number portion often starts from '0', by recognizing '0', it is possible to accurately identify change locations such as the score for both teams, or depending on the display format of the telop data, the out count.

In this case, the data recording/reproduction apparatus 100 has a recognition unit for recognizing '0', and when '0' is recognized, or by detecting the number of times, it sets the hierarchical levels for the basic telop data.

Also, in this embodiment, the data recording/reproduction apparatus 100 sets the hierarchical level for each change location based on the number of changes in the change locations of the basic telop data, and generates index data based on the set hierarchical levels, however, it is also possible to recognize the meaning of each change location in the basic telop data based on whether the basic telop data is displayed or not displayed, and generate index data based on the recognized change locations.

Normally, in the case where the contents data is a relayed broadcast of a baseball game, the telop data that shows the number of the inning and whether it is the top or bottom of the inning, such as when offense and defense changes, may not be displayed for a set period. Also, in the case where the contents data is a relayed broadcast of a boxing match, telop data showing the amount of time remaining in the round for each may not be displayed for a set period. In other words, the period when the telop data that becomes the basic telop data is not displayed often indicates a place where the contents of the contents data changes, and the contents of the contents data often change before and after the period when this basic telop data is not displayed.

Therefore, in this case, the data recording/reproduction apparatus of this embodiment can detect the period when the no-display period of the basic telop data is longer than a preset period, and after the time exceeds that no-display period, it can recognize the change location whose contents changed as a preset change location, and generate index data based on that recognized change location.

Also, in this embodiment, telop data is sorted based on the total display time of the contents data of the telop data, however, it could also be sorted based on the size of the change locations.

This embodiment was explained using the hierarchical levels for each change location in the basic telop data for contents data of a baseball game, however, of course this embodiment is not limited to baseball, and could also be applied to contents data of any sport such as soccer, boxing, or the like in which the telop changes over time.

For example, in the case where the contents data are for a soccer game, the change location in the telop that indicates the score is set to the highest hierarchical level, and the change location that indicates the remaining time is set to a lower hierarchical level.

Also, in this embodiment, the operation of the process for generating index data is executed by the index data generation unit 200, however, the embodiment can be provided with a recording medium on which a program is recorded that regulates the operation of the process for generating index data and a computer that reads that program, and by the computer reading the program, it is possible to perform the same operation of the process for generating index data as described above.

It should be understood that various alternatives to the embodiment of the invention described herein may be employed in practicing the invention. Thus, it is intended that the following claims define the scope of the invention and that methods and structures within the scope of these claims and their equivalents be covered thereby.

The entire disclosure of Japanese Patent Application No. 2003-348390 filed on Oct. 7, 2003 including the specification, claims, drawings and summary are incorporated herein by reference in its entirety.

What is claimed is:

1. An index data generation apparatus comprising:
   an acquisition device which acquires contents data that contains video data which includes at least a preset time length video data;
   an extraction device which extracts sub-image data, that is image data that aids contents of the main-image data that changes over time, from the main-image data that indicates said acquired video data;
   a first detection device which detects partial image data that indicates the areas of change in the images of said extracted sub-image data;
   a second detection device which detects the number of changes and points of change in each detected partial image data when at least two or more said partial image data are detected from one or two or more said sub-image data by said first detection device;
   a setting device which sets hierarchical levels for each partial image data based on the number of changes of said detected partial image data; and
   a generation device which generates index data that indicates a plurality of scenes in said contents data based on the hierarchical levels of each said detected partial-image data and points of change in each said detected partial-image data.

2. The index data generation apparatus according to claim 1, wherein
   said setting device sets said partial-image data having a small number of said changes to a higher hierarchical level than partial-image data having a large number of changes.

3. The index data generation apparatus according to claim 1, wherein
   said second detection device comprises an image-acquisition device of acquiring the sub-image data at the points of change when detecting points of change in said detected partial-image data; and
   said generation device generates said index data and correlates it with said acquired sub-image data.

4. The index data generation apparatus according to claim 1, wherein
   when said extraction device extracts two or more said sub-image data,
   said first detection device comprises a sorting device which sorts the type of said sub-image data into first sub-image data, which is sub-image data for which an area of change should be detected in said partial-image data, and second sub-image data, which is other sub-image data, based on the total display time of the entire contents data of said each sub-image data, and detects partial-image data in said sorted first sub-image data.

5. The index data generation apparatus according to claim 4, wherein
   said setting device comprises a calculation device which calculates a change interval that indicates the interval between each change in the area of change in said first sub-image data sorted by said sorting device, and sets the hierarchical levels for each partial-image data of first sub-image data based on each said calculated change interval and the number of appearances of said second sub-image data sorted by said sorting device in the change interval.

6. The index data generation device according to claim 5, wherein
   said setting device sets hierarchical levels for said second sub-image data that is sorted by said sorting device.

7. A contents data reproduction apparatus comprising:
   an acquisition device which acquires contents data having at least video data;
   an extraction device which extracts sub-image data from the main-image data that indicates said acquired video data and that is image data that aids contents of the main-image data that changes over time;
   a first detection device which detects partial image data that indicates the areas of change in the images of said extracted sub-image data;
   a second detection device which detects the number of changes and points of change in each detected partial image data when at least two or more said partial image data are detected from one or two or more said sub-image data by said first detection device;
   a setting device which sets hierarchical levels for each partial-image data based on the number of changes of said detected partial-image data;
   a generation device which generates index data that indicates a plurality of scenes in said contents data based on the hierarchical levels of each said detected partial-image data and points of change in each said detected partial-image data; and
   a reproduction device which reproduces said contents data based on said generated index data.

8. The contents data reproduction apparatus according to claim 7, wherein
   said setting device sets said partial image data having a small number of said changes to a higher hierarchical level than partial-image data having a large number of changes.

9. The contents data reproduction apparatus according to claim 7, wherein
   said second detection device comprises an image-acquisition device which acquires the sub-image data at the points of change when detecting points of change in said detected partial-image data; and
   said generation device generates said index data and correlates it with said acquired sub-image data.

10. An index data generation method comprising:
    an acquisition process of acquiring contents data that contains at least video data;
    an extraction process of extracting sub-image data from the main-image data that indicates said acquired video data and that is image data that aids contents of the main-image data that changes over time;

a first detection process of detecting partial image data that indicates the areas of change in the images of said extracted sub-image data;

a second detection process of detecting the number of changes and points of change in each detected partial image data when at least two or more said partial image data are detected from one or two or more said sub-image data by said first detection process;

a setting process of setting hierarchical levels for each partial-image data based on the number of changes of said detected partial-image data; and a generation process of generating index data that indicates a plurality of scenes in said contents data based on the hierarchical levels of each said detected partial-image data and points of change in each said detected partial-image data.

11. A contents data reproduction method comprising:

an acquisition process of acquiring contents data having at least video data;

an extraction process of extracting sub-image data from the main-image data that indicates said acquired video data and that is image data that aids contents of the main-image data that changes over time;

a first detection process of detecting partial image data that indicates the areas of change in the images of said extracted sub-image data;

a second detection process of detecting the number of changes and points of change in each detected partial image data when at least two or more said partial image data are detected from one or two or more said sub-image data by said first detection process;

a setting process of setting hierarchical levels for each partial-image data based on the number of changes of said detected partial-image data;

a generation process of generating index data that indicates a plurality of scenes in said contents data based on the hierarchical levels of each said detected partial-image data and points of change in each said detected partial-image data; and a reproduction process of reproducing said contents data based on said generated index data.

12. An information recording medium in which an index-generation program is recorded in a readable way by a computer included in an index data generation apparatus, the index generation program causing the computer to function as:

an acquisition device which acquires contents data that contains at least video data;

an extraction device which extracts sub-image data from the main-image data that indicates said acquired video data and that is image data that aids the main-image data that changes over time;

a first detection device which detects partial image data that indicates the areas of change in the images of said extracted sub-image data;

a second detection device which detects the number of changes and points of change in each detected partial image data when at least two or more said partial image data are detected from one or two or more said sub-image data by said first detection device;

a setting device which sets hierarchical levels for each partial-image data based on the number of changes of said detected partial-image data; and a generation device which generates index data that indicates a plurality of scenes in said contents data based on the hierarchical levels of each said detected partial-image data and points of change in each said detected partial-image data.

13. An information recording medium in which an contents data reproduction program is recorded in a readable way by a computer included in an contents data reproduction apparatus, the contents data reproduction program causing the computer to function as:

an acquisition device which acquires contents data having at least video data;

an extraction device which extracts sub-image data from the main-image data that indicates said acquired video data and that is image data that aids the main-image data that changes over time;

a first detection device which detects partial image data that indicates the areas of change in the images of said extracted sub-image data;

a second detection device which detects the number of changes and points of change in each detected partial image data when at least two or more said partial image data are detected from one or two or more said sub-image data by said first detection device;

a setting device which sets hierarchical levels for each partial-image data based on the number of changes of said detected partial-image data;

a generation device which generates index data that indicates a plurality of scenes in said contents data based on the hierarchical levels of each said detected partial-image data and points of change in each said detected partial-image data; and a reproduction device which reproduces said contents data based on said generated index data.

* * * * *